US009110502B2

(12) United States Patent
Fink (10) Patent No.: US 9,110,502 B2
(45) Date of Patent: Aug. 18, 2015

(54) MOTION SENSING DISPLAY APPARATUSES

(76) Inventor: Ryan Fink, Vancouver, WA (US)

(*) Notice: Subject to any disclaimer, the term of this patent is extended or adjusted under 35 U.S.C. 154(b) by 403 days.

(21) Appl. No.: 13/329,118

(22) Filed: Dec. 16, 2011

(65) Prior Publication Data

US 2012/0280903 A1 Nov. 8, 2012

(51) Int. Cl.
*G06F 3/01* (2006.01)
*G02B 27/00* (2006.01)
*G02B 27/01* (2006.01)

(52) U.S. Cl.
CPC ............ *G06F 3/012* (2013.01); *G02B 27/0093* (2013.01); *G06F 3/017* (2013.01); *G02B 27/017* (2013.01); *G02B 2027/014* (2013.01); *G02B 2027/0138* (2013.01); *G02B 2027/0187* (2013.01)

(58) Field of Classification Search
CPC .......... G02B 27/017–27/0176; G02B 27/0093; G02B 27/0138; G02B 27/014; G02B 27/0187; G06F 3/012; G06F 3/017
USPC .................................................. 345/7, 8, 156
See application file for complete search history.

(56) References Cited

U.S. PATENT DOCUMENTS

| 7,920,102 | B2 * | 4/2011 | Breed ................................. 345/7 |
| 8,179,604 | B1 * | 5/2012 | Prada Gomez et al. ........ 359/630 |
| 8,203,502 | B1 * | 6/2012 | Chi et al. ............................ 345/7 |
| 8,558,759 | B1 * | 10/2013 | Prada Gomez et al. ............ 345/7 |
| 2007/0075919 | A1 * | 4/2007 | Breed ................................. 345/8 |
| 2010/0066676 | A1 * | 3/2010 | Kramer et al. .................. 345/158 |
| 2011/0213664 | A1 * | 9/2011 | Osterhout et al. .......... 705/14.58 |
| 2011/0214082 | A1 * | 9/2011 | Osterhout et al. ............ 715/773 |
| 2011/0221656 | A1 * | 9/2011 | Haddick et al. .................... 345/8 |
| 2011/0221657 | A1 * | 9/2011 | Haddick et al. .................... 345/8 |
| 2011/0221658 | A1 * | 9/2011 | Haddick et al. .................... 345/8 |
| 2011/0221659 | A1 * | 9/2011 | King et al. ......................... 345/8 |
| 2011/0221668 | A1 * | 9/2011 | Haddick et al. ................ 345/156 |
| 2011/0221669 | A1 * | 9/2011 | Shams et al. ................... 345/156 |
| 2011/0221670 | A1 * | 9/2011 | King et al. ..................... 345/156 |
| 2011/0221671 | A1 * | 9/2011 | King et al. ..................... 345/156 |
| 2011/0221672 | A1 * | 9/2011 | Osterhout et al. ............ 345/156 |
| 2011/0221793 | A1 * | 9/2011 | King et al. ..................... 345/690 |
| 2011/0221896 | A1 * | 9/2011 | Haddick et al. ............... 348/143 |
| 2011/0221897 | A1 * | 9/2011 | Haddick et al. ............... 348/143 |
| 2011/0222745 | A1 * | 9/2011 | Osterhout et al. ............ 382/118 |

(Continued)

OTHER PUBLICATIONS

Nike, Inc., Nike+ Website, accessed Feb. 15, 2011. Screen shots from Http://nikerunning.nike.com/nikeos/plus/en_US/plus/#//dashboard/.

(Continued)

*Primary Examiner* — Dmitriy Bolotin
(74) *Attorney, Agent, or Firm* — Mohr Intellectual Property Law Solutions, PC (57) ABSTRACT

Motion-sensing display apparatuses supported near a user's eye including partially transparent screens at least partially disposed within the user's field of vision, image generators positioned to display an image on a first side of the screen, motion capture devices positioned near the screen and configured to capture a user gesture occurring beyond the screen in the user's field of vision, and processors in data communication with the image generator and the motion capture device, the processors configured to execute computer executable instructions in response to the user gesture. In some examples, motion-sensing display apparatuses include cameras. In some further examples, image generators display user interfaces on screens.

19 Claims, 6 Drawing Sheets

(56) References Cited

U.S. PATENT DOCUMENTS

| | | | |
|---|---|---|---|
| 2011/0225536 A1* | 9/2011 | Shams et al. | 715/773 |
| 2011/0227812 A1* | 9/2011 | Haddick et al. | 345/8 |
| 2011/0227813 A1* | 9/2011 | Haddick et al. | 345/8 |
| 2011/0227820 A1* | 9/2011 | Haddick et al. | 345/156 |
| 2011/0231757 A1* | 9/2011 | Haddick et al. | 715/702 |
| 2012/0062445 A1* | 3/2012 | Haddick et al. | 345/8 |
| 2012/0075168 A1* | 3/2012 | Osterhout et al. | 345/8 |
| 2012/0235899 A1* | 9/2012 | Han et al. | 345/156 |
| 2012/0262574 A1* | 10/2012 | Park et al. | 348/143 |
| 2012/0293408 A1* | 11/2012 | Shamaie | 345/156 |
| 2012/0293544 A1* | 11/2012 | Miyamoto et al. | 345/620 |
| 2012/0309535 A1* | 12/2012 | Langridge et al. | 463/39 |
| 2012/0309536 A1* | 12/2012 | Langridge et al. | 463/39 |
| 2013/0050069 A1* | 2/2013 | Ota | 345/156 |

OTHER PUBLICATIONS

Morrissey, Brian, "Nike Plus Starts to Open Up to Web", Adweek, Jul. 20, 2009, accessed Feb. 15, 2011 at http://www.adweek.com/aw/content_display/news/e3ibdf529f18374f6c9e0916614874bf862.

Runkeeper, "Track Your Running Measure your Fitness, and Improver Your Training", accessed Feb. 15, 2011 at http://runkeeper.com/.

Apple, Inc., "iTunes Preview of Run Keeper Pro", accessed Feb. 15, 2011 at http://itunes.apple.com/us/app/runkeeper-pro/id300235330?mt=8.

Geek Dad Blog, "The Technology Behind the Microsoft xBox Kinect Motion Control System", accessed Nov. 10, 2011 at http://geekdad.daddyforever.com/primesense/.

* cited by examiner

MOTION SENSING DISPLAY APPARATUSES

BACKGROUND

The present disclosure relates generally to motion-sensing display apparatuses. In particular, motion-sensing display apparatuses supported near a user's eye that execute computer executable instructions in response to user gestures are described.

Known motion-sensing display apparatuses are not entirely satisfactory for the range of applications in which they are employed. Some existing display apparatuses are configured to interface with motion-sensing technologies, such as the Microsoft® Kinect® system. Many such apparatuses, however, do not provide a display proximate a user's eye. As a result, these devices are often ill-suited for displaying images that encompass large portions of a user's field of vision. Further, conventional motion sensing technology is generally large and not portable, limiting its use outside of a user's home or during physical activities.

Often, these displays include an opaque backing that prevents a user from seeing beyond the display. As a result, these devices are often unable augment or overlay scenes within the user's field of vision. Other devices may use a camera to capture a scene beyond the display and augment this captured scene on a display. This often results in unnatural and unreliable displays, however.

Certain display apparatuses are mounted near a user's eye with a piece of eyewear. These devices often produce a display that encompass a large portion of a user's field of vision. These devices, however, often include an opaque backing, preventing the ability to augment natural scenes and view user motions or gestures occurring beyond the screen. This, commonly in conjunction with the use of unwieldy accessories, leads to poor motion capture capabilities (if any exist at all).

Some other devices mounted on a piece of eyewear, such as Vuzix® brand eyewear devices, provide a display on a partially transparent screen. However, these devices often lack support for image capturing and motion sensing functionality. By extension, they often lack the ability to execute computer instructions in response to motion or natural images, including the ability to manipulate the display.

Thus, there exists a need for motion-sensing display apparatuses that improve upon and advance the design of known motion-sensing devices and display devices. Examples of new and useful motion-sensing display apparatuses relevant to the needs existing in the field are discussed below.

SUMMARY

The present disclosure is directed to motion-sensing display apparatuses supported near a user's eye including partially transparent screens at least partially disposed within the user's field of vision, image generators positioned to display an image on a first side of the screen, motion capture devices positioned near the screen and configured to capture a user gesture occurring beyond the screen in the user's field of vision, and processors in data communication with the image generator and the motion capture device, the processors configured to execute computer executable instructions in response to the user gesture. In some examples, motion-sensing display apparatuses include cameras. In some further examples, image generators display user interfaces on screens.

DETAILED DESCRIPTION

The disclosed motion-sensing display apparatuses will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various motion-sensing display apparatuses are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Figure 1:
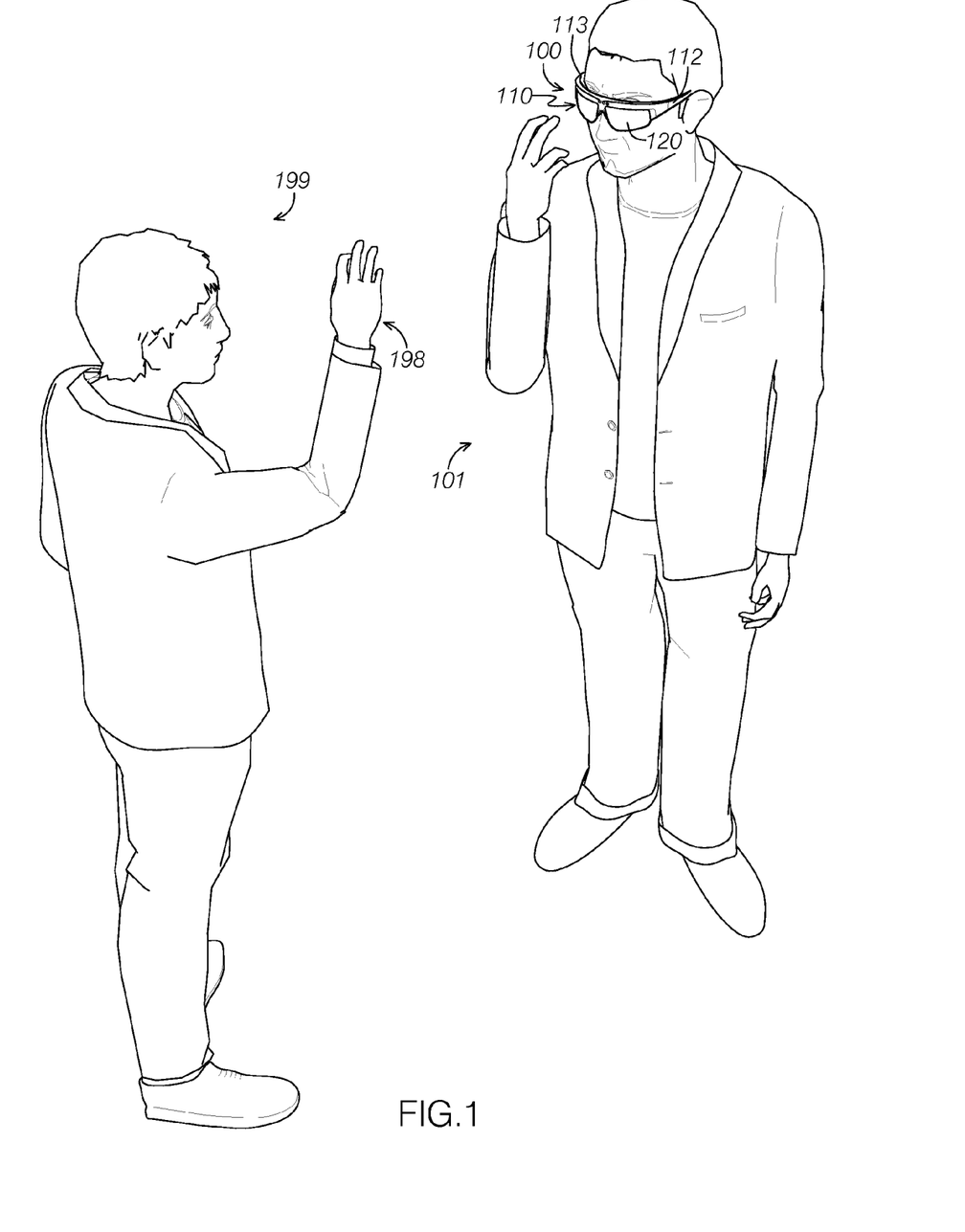
FIG. 1 is a perspective view of a first example of a motion-sensing display apparatus being worn by a user.
Figure 2:
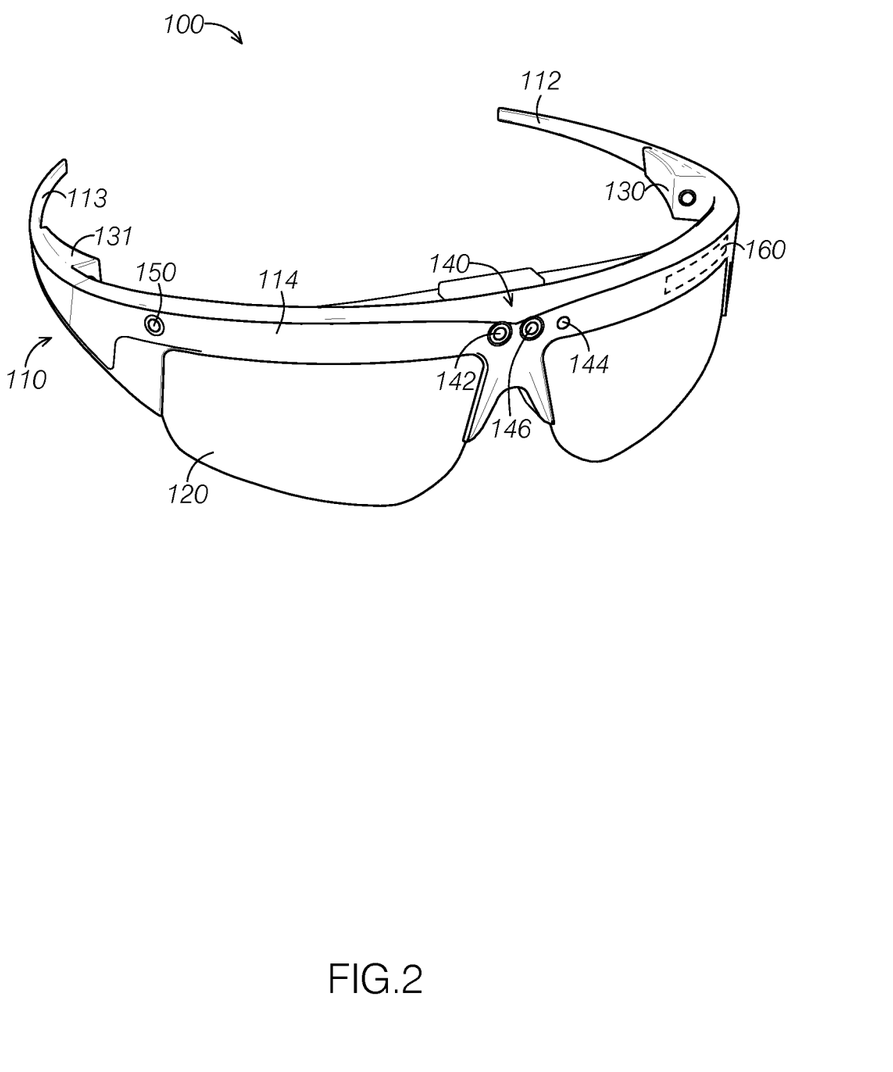
FIG. 2 is a perspective view of the motion-sensing display apparatus shown in FIG. 1.

With reference to FIG. 1, motion-sensing display apparatus 100 is designed to display an image near a user 101's eye and execute computer executable instructions in response user gestures by incorporating motion and image capture features. As FIG. 2 illustrates, motion-sensing display apparatus 100 includes an eyewear article 110, a processor 160, a lens 120, an image generator 130, a motion capture device 140, and a microphone 150. Motion-sensing display apparatus 100 is configured to capture user gestures, along with other objects within a captured scene, and execute computer processes in response to the captured objects. This may involve manipulating a display produced by image generator 130 on lens 120. Motion-sensing display apparatus 100 may additionally execute computer processes in response to audio captured by microphone 150. By incorporating these capturing technologies, motion-sensing display apparatus 100 provides a new and useful way of displaying and controlling computer images and processes.

As FIG. 1 illustrates, eyewear article 110 supports motion-sensing display apparatus 100 on user 101's head. Looking to FIG. 2, eyewear article 110 includes a first temple 112, a second temple 113, and a bar 114 extending between the two temples. As FIG. 1 illustrates, first temple 112 and second temple 113 extend from eyewear article 110 to rest on user 101's ears, providing support for motion-sensing display apparatus 100.

As FIG. 2 illustrates, processor 160 is supported by bar 114. Processor 160 is configured execute computer executable instructions, and may, by extension, control the electronic elements of motion-sensing display apparatus 100.

Processor 160 may acquire data from other elements of motion-sensing display apparatus 100 or from external sources and execute computer executable code in response to this data. For example, processor 160 is configured to acquire data from motion capture device 140 such as data that corresponds to a user gesture. Processor 160 may additionally or alternatively acquire data from microphone 150. In some examples, the processor acquires data from a separate device, such as a portable music player, a personal data assistant, a smart phone, a global positioning system, or the like.

Figure 3:
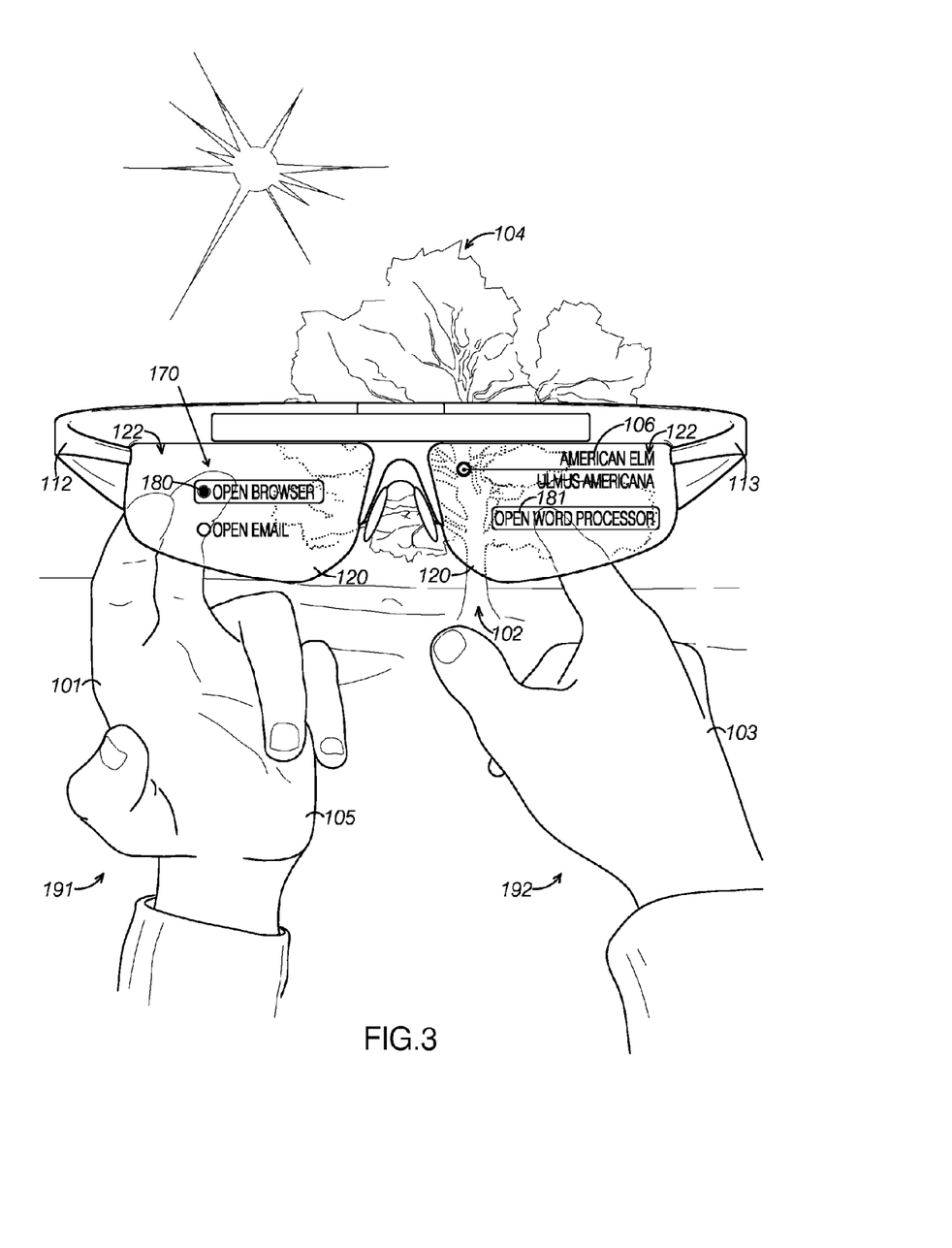
FIG. 3 is a rear elevation view of the motion-sensing display apparatus shown in FIG. 1 showing a user performing a gesture and a screen, upon which an image generator is displaying a user interface.

Processor 160 is in data communication with image generator 130 and may instruct image generator 130 to generate and manipulate a display projected on lens 120. As FIG. 3 illustrates, processor 160 may, for example, generate a user interface 170 on lens 120. Processor 160 may acquire data from other elements of motion-sensing display apparatus 100 and manipulate the user interface in response to this data.

As FIG. 1 illustrates, eyewear article 110 supports lens 120 substantially near user 101's eyes. As FIG. 3 shows, lens 120 defines a partially transparent screen 122 at least partially disposed within user 101's field of vision. Because screen 122 is partially transparent, a user is able to view objects beyond screen 122, which may include, for example, gestures being performing and other objects within his environment.

As FIG. 2 illustrates, image generator 130 is attached to first temple 112 and is substantially aligned with screen 122. As FIG. 2 shows, a second image generator, image generator 131, is attached to second temple 113 to project images on screen 122 distal image generator 130. This disclosure specifically contemplates positioning additional image generators augment the expanse of generated images over a screen's surface area. Image generator 130 is configured to display images on a first side of screen 122 facing user 101's eye in response to instructions executed by processor 160. These images often may overlay and/or augment a naturally viewed scene within user 101's field of vision. Image generator 130 may display both opaque and partially transparent images on screen 122.

FIG. 3 illustrates a representative set of images generated by image generator 130; the generated images include a user interface 170 that overlays and augments a scene 102 within user 101's field of vision. User interface 170 may include one or more opaque or partially transparent screen elements that overlay a portion of scene 102 while providing user 101 a partially unobstructed view of scene 102. As FIG. 3 illustrates, certain elements of user interface 170 allow user 101 to view elements behind displayed elements.

As FIG. 2 illustrates, motion capture device 140 is affixed to bar 114 and is oriented away from user 101 when user 101 is wearing eyewear article 110 to capture images and motion occurring beyond screen 122. As FIG. 2 shows, motion capture device 140 includes an image sensor 142 including a camera, a light source 144, and a depth sensor 146. Motion capture device 140 captures scene 102, which comprises everything viewable by motion capture device 140. FIG. 3 illustrates an example of such a scene.

As FIG. 2 shows, image sensor 142 is supported by bar 114 and oriented away from user 101 as user 101 wears eyewear article 110. Image sensor 142 is configured to capture an image from a scene and communicate data corresponding to the captured image to processor 160. Image sensor 142 is not limited to capturing light within the visual spectrum. Image sensor 142 may, for example, capture infrared or ultraviolet light reflected on a scene from an artificial light source.

As FIG. 2 shows, light source 144 is supported by bar 114 and is substantially aligned with image sensor 142. Light source 144 is configured to project light onto a scene. This light is reflected from the scene and may be captured by motion capture device 140. This may allow motion capture device 140 to more accurately capture images and motion present within the scene. Light source 144 is capable of projecting visual light as well as light outside the visual spectrum, which may improve capturing accuracy without altering the scene's natural appearance.

As FIG. 2 illustrates, depth sensor 146 is supported by bar 114 and is horizontally spaced from image sensor 142. Depth sensor 146 is configured to capture images and motion from a scene at a different angle than image generator 130. The data captured from this second viewpoint allows processor 160 to compare the data communicated by depth sensor 146 to the data communicated by image sensor 142 to better detect objects' depth in the captured scene.

Figure 4:
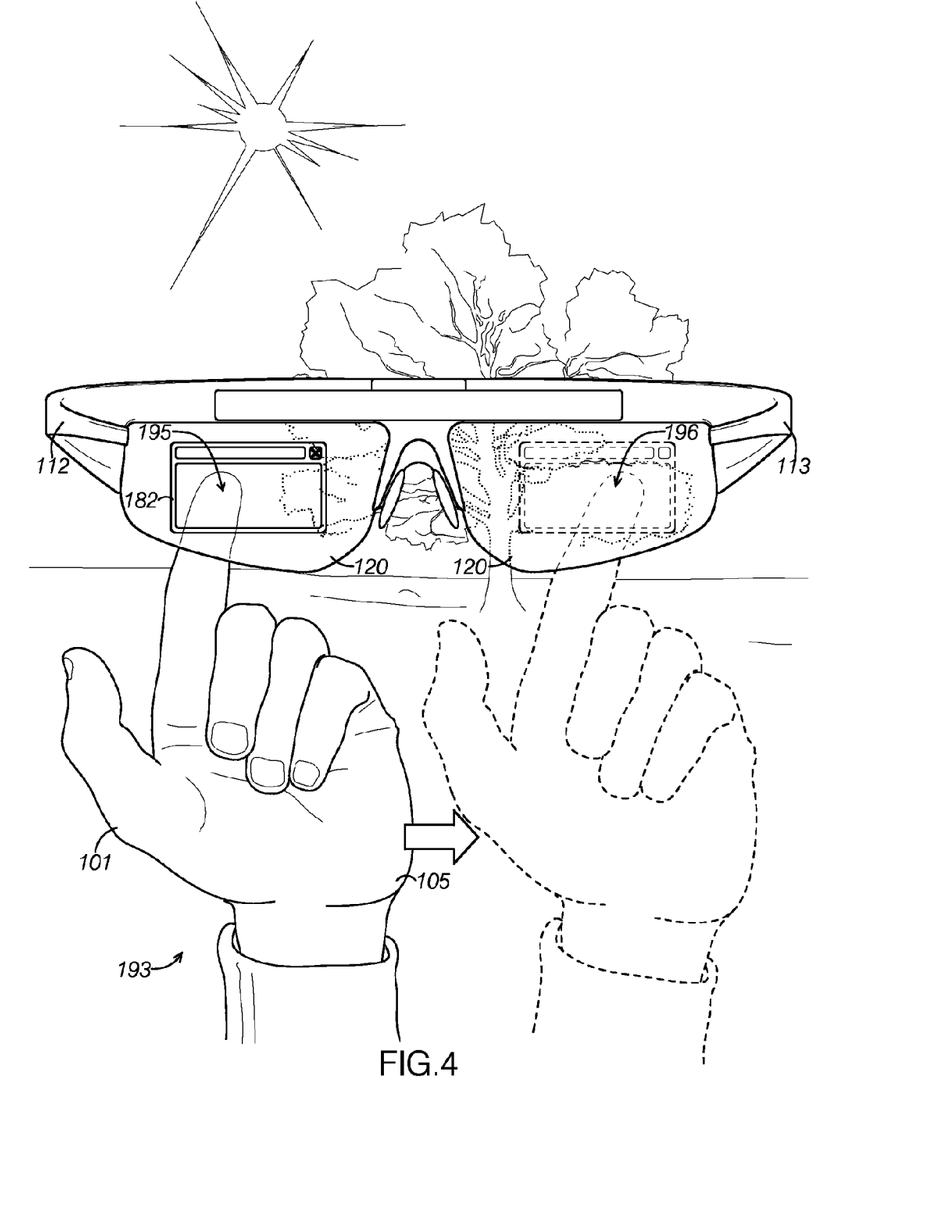
FIG. 4 is a rear elevation view of the motion-sensing display apparatus shown in FIG. 1 showing the user performing a second gesture.
Figure 5:
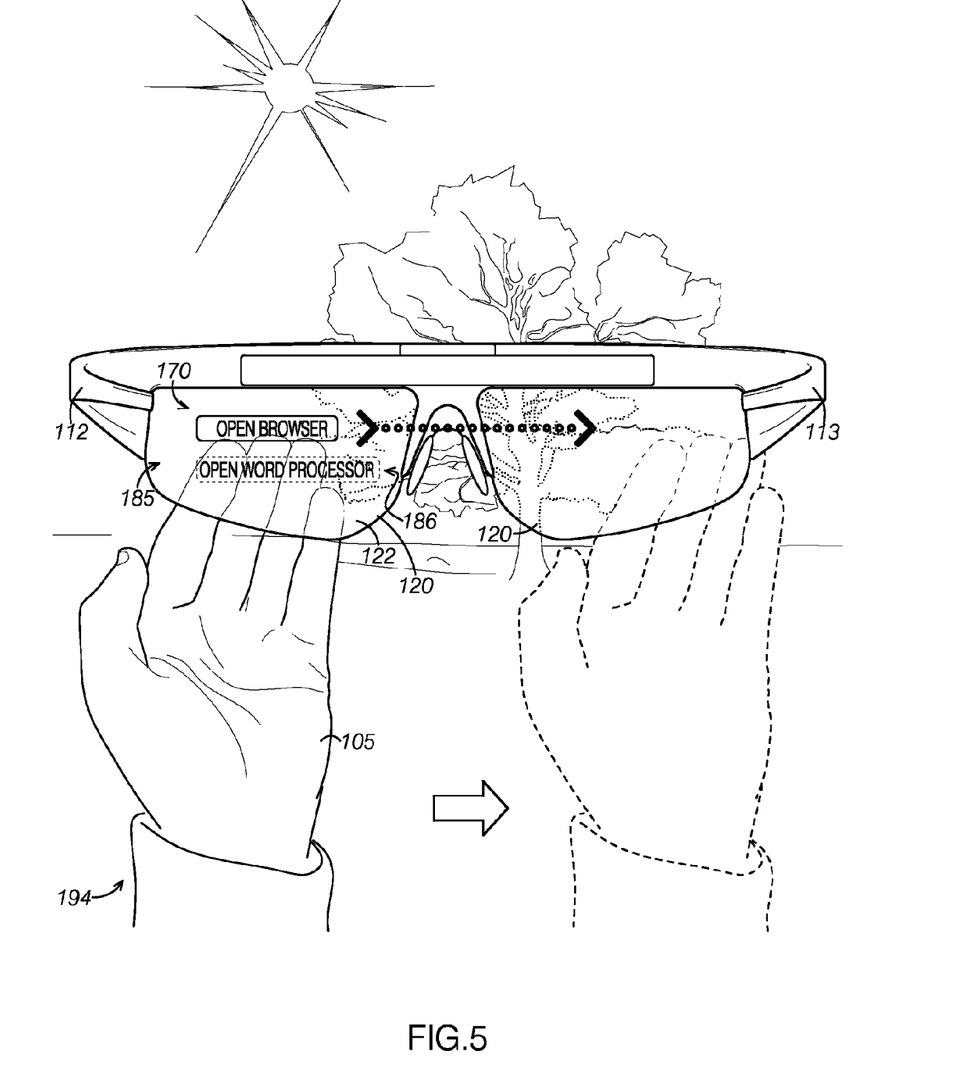
FIG. 5 is a rear elevation view of the motion-sensing display apparatus shown in FIG. 1 showing the user performing a third gesture.

As FIGS. 3-5 illustrate, motion capture device 140 may capture images and motion that correspond to a user gesture, such as a gesture 191, a gesture 192, a gesture 193, and/or a gesture 194. Upon capturing a gesture, motion capture device 140 communicates data corresponding to the gesture to processor 160, which executes computer executable instructions in response to received data.

For example, FIG. 3 illustrates a first hand 105 of user 101 performing gesture 191 as image generator 130 generates user interface 170 including a radio button 180 adjacent to a caption reading "OPEN BROWSER." User 101 performs gesture 191 by extending two fingers beyond screen 122 to align with a selected screen element, such as radio button 180, in the user's field of vision. As user 101 extends his fingers, motion capture device 140 captures this motion and communicates data corresponding to this gesture to processor 160. Processor 160 then executes computer executable instructions in response to this data. In this example, processor 160 selects radio button 180 in response to gesture 191.

FIG. 3 illustrates a second hand 103 performing gesture 192 in concert with gesture 191. As gesture 192 shows, motion-sensing display apparatuses may capture multiple gestures being operated in concert. As FIG. 3 shows, gesture 192 is similar to gesture 191, wherein hand 103 extends two fingers beyond screen 122 and aligned with a button 181 reading "OPEN WORD PROCESSOR" in user interface 170. As user 101 extends fingers of his second hand, motion capture device 140 communicates data relating to this gesture to processor 160, and processor 160 executes computer executable instructions to launch a word browsing application in response.

FIG. 4 illustrates gesture 193, which is captured and processed similar to gesture 191. User 101 performs gesture 193 by extending a single finger to align with a screen element, window 182, at a first position 195 within user interface 170 and moving the extended finger to align with a second position 196 within user interface 170. In response, processor 160 moves window 182 from its original position proximate first position 195 to a second position proximate second position 196.

FIG. 4 illustrates gesture 194, which is also captured and processed similar to gesture 191. User 101 performs gesture 193 by extending all of his fingers to align with user interface 170 and swiping the full hand horizontally across screen 122. In response, processor 160 changes the display on screen 122 from a first display window 185 to a second display window 186, wherein each display window includes a collection of screen elements. In this example, first display window 185 includes a button for "OPEN BROWSER," which is displayed prior to swiping the full hand and removed after Likewise, second display window 186 includes a button for "OPEN WORD PROCESSOR" in this example, which appears after swiping the hand. This is designed to provide similar functionality to screen switching available on many mobile phone platforms.

As gesture 192 illustrates, motion-sensing display apparatus 100 is capable of distinguishing a user from the remainder of a captured scene. For example, motion-sensing display apparatus 100 may distinguish between different users, such as when a person other than the user performs a second user gesture in the view of motion capture device 140. FIG. 1 displays such an example, wherein both user 101 and a second user 199 are performing gestures. Motion capture device 140 is configured to capture user 101's gestures as well as second user gesture 198. This disclosure additionally or alternatively contemplates gestures that incorporate multiple movements, which may be performed by multiple parts of a user's body. For example, gestures may incorporate actions by a user's hands and/or feet. Processor 160 configured to execute computer executable instructions in response these captured images and motions, which may include second user gesture 198.

Processor 160 may additionally store captured data to learn a user's features. In certain examples, users may verify processor 160's user differentiating functionality to train processor 160 to better differentiate users.

As FIG. 3 illustrates, motion-sensing display apparatus 100 is not specifically restricted to capturing user gestures. Motion-sensing display apparatus 100 may capture any element of a captured scene and communicate data related to that element to processor 160. Processor 160 may then execute computer executable instructions in response to the captured element. For example, FIG. 3 illustrates motion capture device 140 capturing a scene including a tree 104. As FIG. 3 shows, processor 160 executes computer executable code to display a dialog 106 in response to capturing the tree. This disclosure specifically contemplates gesture based interaction with dialogs displayed in response to captured elements in a scene, such as dialog 106.

As FIG. 2 illustrates, microphone 150 is supported by bar 114. Microphone 150 defines an opening substantially aligned with motion capture device 140 that allows sound to reach microphone 150. Microphone 150 captures audio data as motion capture device 140 operates. Microphone 150 communicates captured data to processor 160, which may execute computer executable instructions in response. Processor 160 may act in response to the audio data either alone or in concert with data captured by motion capture device 140. Processor 160 may, for example, respond to a user's vocal commands or respond to noises present in motion-sensing display apparatus 100's environment.

Figure 6:
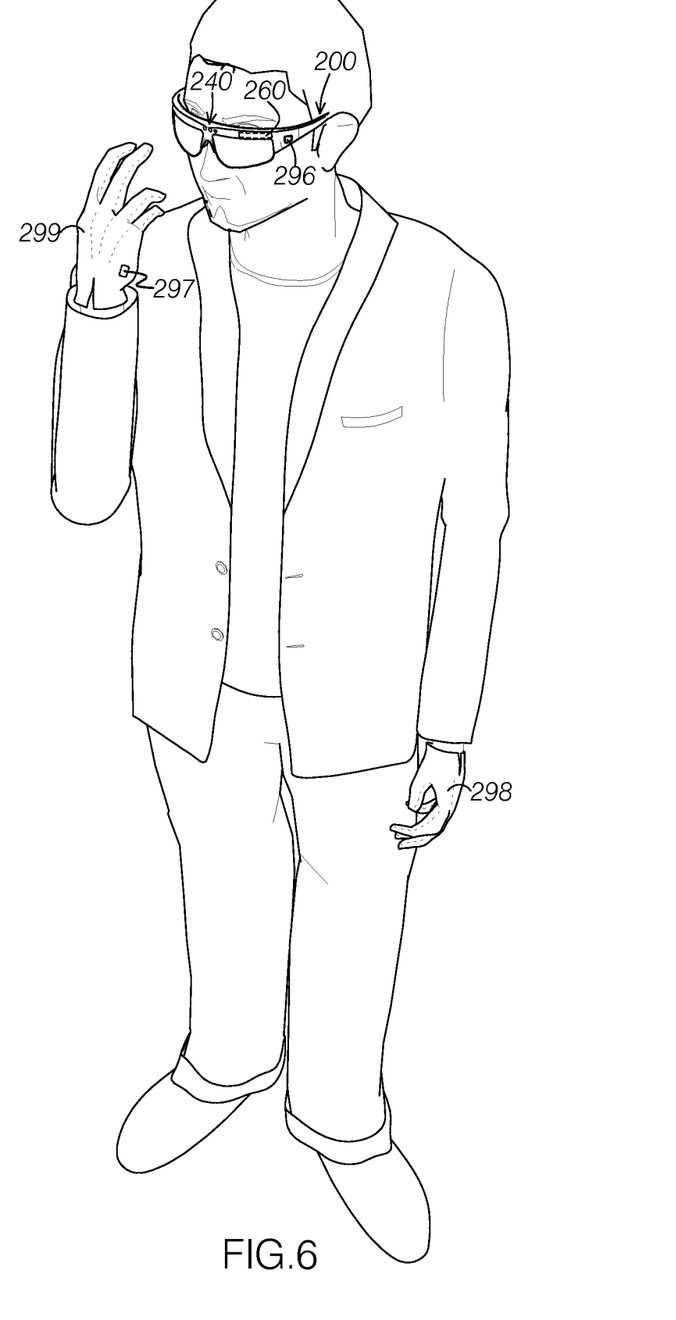
FIG. 6 is a perspective view of a second example of a motion-sensing display apparatus being worn by a user, the motion-sensing display apparatus including a glove accessory.

With reference to FIG. 6, a second example of a motion-sensing display apparatus, motion-sensing display apparatus 200, will now be described. Motion-sensing display apparatus 200 includes many similar or identical features to motion-sensing display apparatus 100. Thus, for the sake of brevity, each feature of motion-sensing display apparatus 200 will not be redundantly explained. Rather, key distinctions between motion-sensing display apparatus 200 and motion-sensing display apparatus 100 will be described in detail and the reader should reference the discussion above for features substantially similar between the two motion-sensing display apparatuses.

As FIG. 6 shows, motion-sensing display apparatus 200 provides a motion-sensing display substantially similar to motion-sensing display apparatus 100. Motion-sensing display apparatus 200 includes a processor 260 and a motion capture device 240, each substantially similar to the corresponding elements of motion-sensing display apparatus 200. Motion-sensing display apparatus 200, however, additionally includes a motion capture accessory 299.

Motion capture accessory 299 is configured to augment motion capture device 240 in capturing the gesture. Motion capture accessory 299 defines a glove in data communication with processor 260. As FIG. 6 shows, this disclosure additionally or alternatively contemplates the use of more than one accessory; motion-sensing display apparatus 200 includes, for example, a second accessory 298 defining a glove on the opposite hand of motion capture accessory 299. Both accessories may include movement sensors, such as accelerometers or gyroscopes, to capture data relating to user movement and communicate this data to processor 260. This allows processor 260 to respond to user movement more precisely.

As FIG. 6 shows, motion capture accessory 299 includes a transmitter 297 configured to communicate wirelessly with a receiver 296 proximate to and in data communication with processor 260. This allows motion capture accessory 299 to communicate any captured data to processor 260.

Accessories may additionally include elements that allow motion capture device 240 to track its position more accurately. Such elements may be bodies attached to the exterior of the accessories. Accessories may additionally or alternatively be constructed of a material selected for increased compatibility with motion capture device 240. Such accessories may assist motion capture device 240 in capturing the movement, location, and shape of the relevant parts of the user or of the accessory without requiring a data connection with processor 160.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A motion-sensing display apparatus supported near a user's eye, the motion-sensing display apparatus comprising:
a partially transparent screen at least partially disposed within the user's field of vision;
an image generator positioned to display an image on a first side of the screen;
a user interface displayed by the image generator on the screen comprised of at least one element which overlays so as to obscure a portion of the scene naturally viewed through the screen;
a motion capture device positioned near the screen and configured to capture user gestures occurring beyond the screen in the user's field of vision wherein a first user gesture interacts with at least one of the overlaid user interface elements, and a second user gesture interacts with at least one of the overlaid user interface elements; and
a processor in data communication with the image generator and the motion capture device, the processor configured to execute computer executable instructions in response to the first user gesture in concert with the second user gesture.

2. The motion-sensing display apparatus of claim 1, wherein the processor is configured to execute computer executable instructions to manipulate the user interface in response to user gestures.

3. The motion-sensing display apparatus of claim 2, wherein the processor is configured to execute computer executable instructions to adjust the position of a selected element of the user interface in response to the user moving a finger from a first point to a second point spaced from the second point, wherein the second point is aligned with the user interface within the user's field of vision.

4. The motion-sensing display apparatus of claim 1, wherein the motion capture device includes a motion capture accessory configured to augment capturing the gesture.

5. The motion-sensing display apparatus of claim 4, wherein the accessory includes a glove.

6. The motion-sensing display apparatus of claim 4, wherein the accessory is in data communication with the processor and is configured to communicate with the processor wirelessly.

7. The motion-sensing display apparatus of claim 1, wherein the processor is configured to execute computer executable instructions for distinguishing the user from the remainder of a captured scene.

8. The motion-sensing display apparatus of claim 7, wherein the processor executes computer executable instructions in response to a portion of the remainder of the captured scene.

9. The motion-sensing display apparatus of claim 1, wherein the processor is configured to distinguish between gestures made by the user and gestures made by a person other than the user, and execute computer executable instructions in response to the gestures made by the person other than the user.

10. The motion-sensing display apparatus of claim 1, further comprising an eyewear article configured to support the screen and the motion capture device.

11. The motion-sensing display apparatus of claim 1, wherein the motion capture device includes an image sensor.

12. The motion-sensing display apparatus of claim 11, further comprising a light source producing illumination substantially aligned with the image sensor, wherein the light source improves the accuracy of the motion capture device without altering the naturally viewed scene's appearance.

13. The motion-sensing display apparatus of claim 12, wherein the light source produces light outside the visual spectrum.

14. The motion-sensing display apparatus of claim 12, wherein the image sensor includes a depth sensor configured to detect the illumination produced by the light source.

15. The motion-sensing display apparatus of claim 1, further comprising a microphone in data communication with the processor, wherein the processor is configured to execute computer executable instructions in response to audio captured by the microphone.

16. The motion-sensing display apparatus of claim 1, wherein the second user gesture is performed by a different hand than the hand performing the first user gesture.

17. The motion-sensing display apparatus of claim 1, wherein the at least one of the overlaid user interface elements the second user gesture interacts with is different from the at least one of the overlaid user interface elements the first user gesture interacts with.

18. A motion-sensing display apparatus for interpreting a user's motion to control software applications, comprising:
an eyewear article including a substantially transparent lens;
an image generator in a position to display an image on the lens;
a user interface displayed by the image generator on the screen comprised of a plurality of elements which overlay so as to obscure a portion of the scene naturally viewed through the screen;
a motion capture device comprising a camera positioned proximate the screen and configured to capture user gestures made in front of the lens; and
a processor in data communication with the image generator and the motion capture device;
wherein a first user gesture performed by a first hand interacts with at least one of the plurality of elements of the overlaid user interface elements, a second user gesture performed by a second hand and in concert with the first user gesture interacts with a second of the plurality of elements of the overlaid user interface elements, and the processor is configured to execute a first set of computer executable instructions in response to the first user gesture, and a second set of computer executable instructions in response to the second user gesture, and the motion capture device can be configured to distinguish between gestures made by the user and gestures made by a person other than the user.

19. A motion-sensing display apparatus for interpreting a user's motion to control software applications, comprising:
a partially transparent screen at least partially disposed within the user's field of vision;
an image generator in a position to display a user interface on the screen;
a user interface displayed by the image generator on the screen comprised of at least one element which overlays so as to obscure a portion of the scene naturally viewed through the screen;
a motion capture device mounted near the screen and configured to capture a user gesture occurring beyond the screen in the user's field of vision and interacting with at least one of the overlaid user interface elements; and
a processor in data communication with the image generator and the motion capture device, the processor configured to manipulate the user interface in response to the user gesture, and configured to execute computer executable instructions to select a screen element generated by the image generator of the user interface in response to the user extending two fingers in parallel and substantially aligning the parallel extended fingers with the selected element in the user's field of vision.

* * * * *